US012746870B2

(12) United States Patent
Lin et al.

(10) Patent No.: US 12,746,870 B2
(45) Date of Patent: Sep. 29, 2026

(54) VEHICLE LAMP SYSTEM AND ACTIVE LIGHT ADJUSTMENT METHOD FOR A VEHICLE LAMP SYSTEM

(71) Applicant: Wistron Corporation, New Taipei City (TW)

(72) Inventors: Hsiu Mei Lin, New Taipei City (TW); Chien Hua Chen, New Taipei City (TW); Chin Hao Hsu, New Taipei City (TW); Chih Hao Chiu, New Taipei City (TW); Zhu Xuan Xie, New Taipei City (TW); Hsiao Chang Lin, New Taipei City (TW); Po Liang Huang, New Taipei City (TW); Ming Chiuan Jing, New Taipei City (TW)

(73) Assignee: Wistron Corporation, New Taipei City (TW)

( * ) Notice: Subject to any disclaimer, the term of this patent is extended or adjusted under 35 U.S.C. 154(b) by 19 days.

(21) Appl. No.: 19/017,803

(22) Filed: Jan. 13, 2025

(65) Prior Publication Data

US 2026/0158988 A1 Jun. 11, 2026

(30) Foreign Application Priority Data

Dec. 6, 2024 (TW) ................................ 113147453

(51) Int. Cl.
*B60Q 1/14* (2006.01)

(52) U.S. Cl.
CPC ........ *B60Q 1/1423* (2013.01); *B60Q 2300/41* (2013.01); *B60Q 2300/42* (2013.01)

(58) Field of Classification Search
CPC .............. B60Q 1/1423; B60Q 2300/41; B60Q 2300/42
See application file for complete search history.

(56) References Cited

U.S. PATENT DOCUMENTS

2008/0101077 A1* 5/2008 Watanabe ............ B60Q 1/1423 362/466
2018/0354406 A1 12/2018 Park
(Continued)

FOREIGN PATENT DOCUMENTS

JP 2003331616 11/2003

OTHER PUBLICATIONS

Marcel Philipp Held et al., "Efficient conceptual design for LED-based pixel light vehicle headlamps", Proceedings of the SPIE, Dec. 2017, pp. 1060315-1-1060615-7, vol. 10603.

*Primary Examiner* — Henry Luong
(74) *Attorney, Agent, or Firm* — JCIPRNET

(57) ABSTRACT

A vehicle lamp system includes a substrate and a plurality of light-emitting devices. The substrate has a first region, a second region, and a third region. The first region corresponds to a direction of an oncoming vehicle, and the second region and the third region correspond to a direction of a preceding vehicle in the same direction. The second region is located above the third region. The light-emitting devices are disposed on the substrate and distributed in the first region, the second region, and the third region. An interval between the light-emitting devices in the first region is greater than an interval between the light-emitting devices in the second region. The interval between the light-emitting devices in the second region is greater than an interval between the light-emitting devices in the third region. An active light adjustment method for a vehicle lamp system is also provided.

7 Claims, 9 Drawing Sheets

(56) References Cited

U.S. PATENT DOCUMENTS

| | | | |
|---|---|---|---|
| 2019/0128497 | A1 | 5/2019 | Tessnow et al. |
| 2020/0353858 | A1 | 11/2020 | Sawada |

* cited by examiner

VEHICLE LAMP SYSTEM AND ACTIVE LIGHT ADJUSTMENT METHOD FOR A VEHICLE LAMP SYSTEM

CROSS-REFERENCE TO RELATED APPLICATION

This application claims the priority benefit of Taiwan patent application serial no. 113147453, filed on Dec. 6, 2024. The entirety of the above-mentioned patent application is hereby incorporated by reference herein and made a part of this specification.

BACKGROUND

Technical Field

The disclosure relates to a light source system and a light adjustment method for the light source system, and particularly relates to a vehicle lamp system and an active light adjustment method for the vehicle lamp system.

Description of Related Art

Current LED vehicle lamps utilize densely arranged LED lamp beads and provide varying current levels to these LED lamp beads in different regions to generate distinct light patterns. However, the high current levels and compact spatial arrangement of the LEDs can lead to heat accumulation, necessitating the design of more complex heat dissipation systems to mitigate this issue.

In addition, the current vehicle lamp illumination algorithm for adaptive driving beam systems (ADBS) calculates the position of preceding vehicles and compares them with the field of view of the effective illumination range of each LED one by one. When a preceding vehicle enters the field of view of the effective illumination range of a specific LED, the LED is turned off. However, this method is overly complex, as it requires individual examination of the field of view of each LED to determine whether to turn off the light.

SUMMARY

The disclosure provides a vehicle lamp system with less severe heat accumulation, which may not require the use of a complex heat dissipation system.

The disclosure provides an active light adjustment method for a vehicle lamp system, and the method is simpler and less complex.

An embodiment of the disclosure provides a vehicle lamp system that includes a substrate and a plurality of light-emitting devices. The substrate has a first region, a second region, and a third region, where the first region corresponds to a direction of an oncoming vehicle, the second region and the third region correspond to a direction of a preceding vehicle in a same direction, and the second region is located above the third region. The light-emitting devices are disposed on the substrate and distributed in the first region, the second region, and the third region, where an interval between the light-emitting devices in the first region is greater than an interval between the light-emitting devices in the second region, and the interval between the light-emitting devices in the second region is greater than an interval between the light-emitting devices in the third region.

An embodiment of the disclosure provides an active light adjustment method for a vehicle lamp system, and the method includes following steps. A vehicle lamp system is provided, where the vehicle lamp system includes a plurality of light-emitting devices and a sensor. At least one traffic object ahead is sensed by the sensor. Based on a sensing signal generated by the sensor, it is determined whether the at least one traffic object falls within shadow regions generated in response to at least one part of the light-emitting devices being turned off, and in response to determining that the at least one traffic object falls within the shadow regions generated in response to the at least one part of the light-emitting devices being turned off, a brightness of the at least one part of the light-emitting devices is reduced, or the at least one part of the light-emitting devices is turned off.

In the vehicle lamp system provided in one or more embodiments of the disclosure, the interval between the light-emitting devices in the first region is greater than the interval between the light-emitting devices in the second region, and the interval between the light-emitting devices in the second region is greater than the interval between the light-emitting devices in the third region. This design features a less dense arrangement of the light-emitting devices, resulting in less severe heat accumulation. Therefore, the vehicle lamp system provided in one or more embodiments of the disclosure may require no use of a complex heat dissipation system and thus may have a simpler structure and cost less. In the active light adjustment method for the vehicle lamp system provided in one or more embodiments of the disclosure, whether to reduce the brightness or turn off the light-emitting devices is determined by determining, based on the sensing signal generated by the sensor, whether the at least one traffic object falls within the shadow regions generated in response to at least one part of the light-emitting devices being turned off. Therefore, the active light adjustment method for the vehicle lamp system provided in one or more embodiments of the disclosure is simpler and less complex.

DESCRIPTION OF THE EMBODIMENTS

Figure 1:
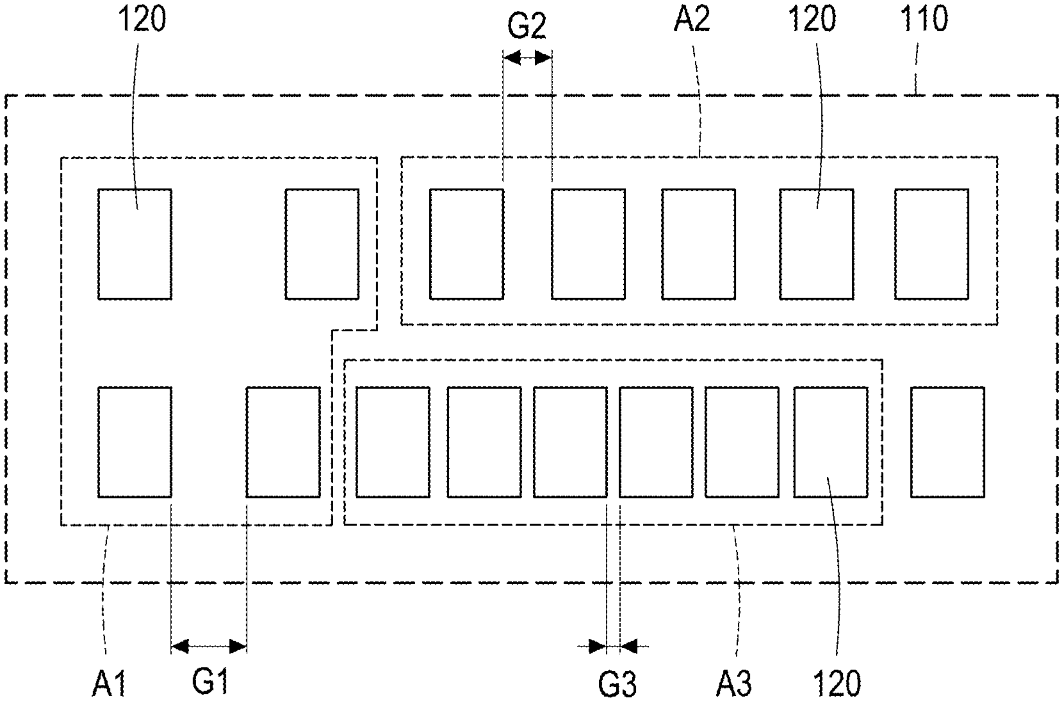
FIG. 1 is a schematic rear view of a substrate and light-emitting devices according to an embodiment of the disclosure.
Figure 2:
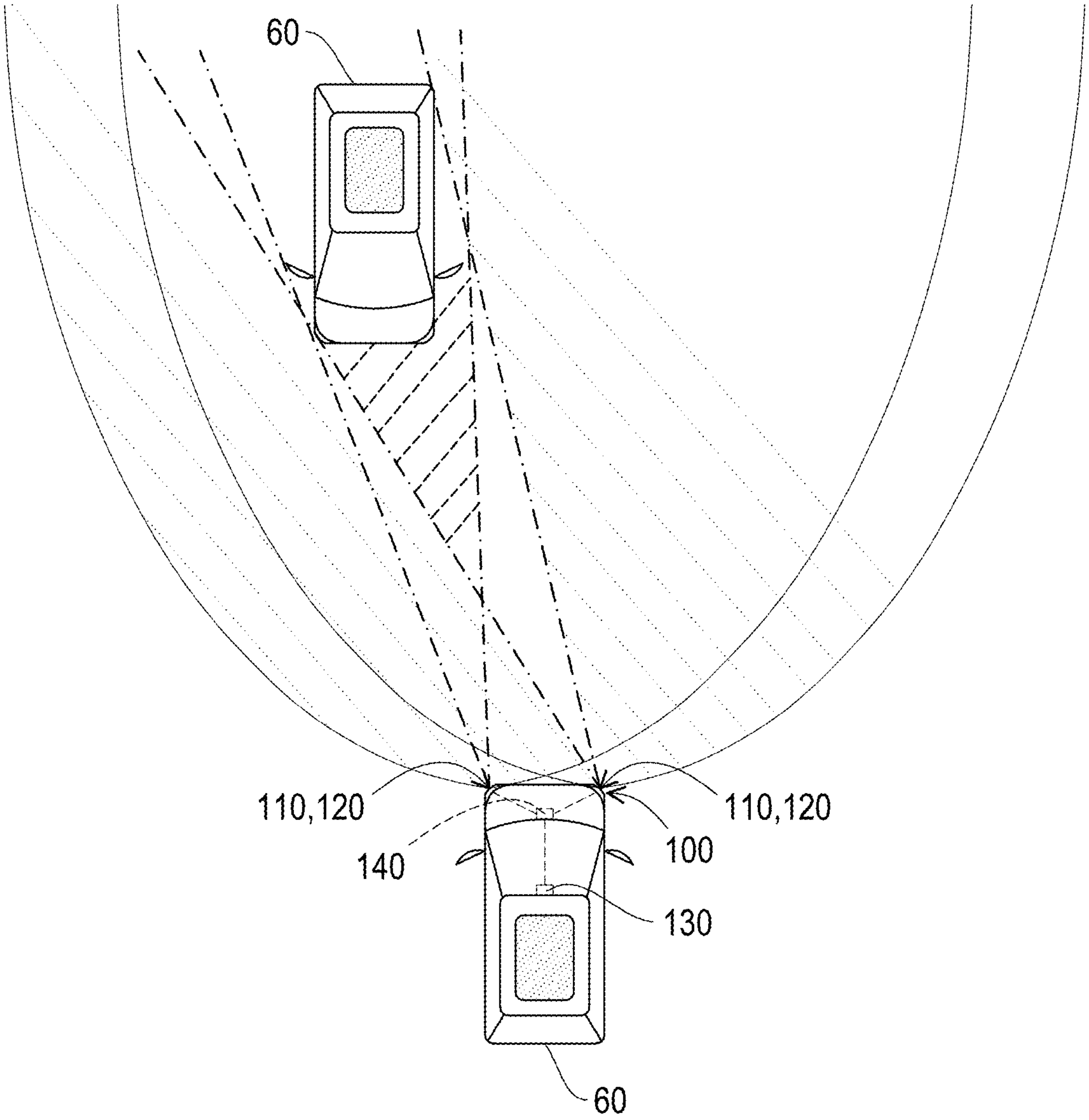
FIG. 2 is a schematic top view illustrating the relationship between a vehicle equipped with a vehicle lamp system according to an embodiment of the disclosure and an oncoming vehicle.

FIG. 1 is a schematic rear view of a substrate and light-emitting devices according to an embodiment of the disclosure, and FIG. 2 is a schematic top view illustrating the relationship between a vehicle equipped with a vehicle lamp system according to an embodiment of the disclosure and an oncoming vehicle. With reference to FIG. 1 and FIG. 2, a vehicle lamp system 100 provided in this embodiment includes a substrate 110 and a plurality of light-emitting devices 120, and the light-emitting devices 120 are disposed on the substrate 110. FIG. 1 is a rear view observed from the rear side of the substrate 110. Typically, the substrate 110 should cover the light-emitting devices 120; however, in order to clearly illustrate the positions of the light-emitting devices 120, the substrate 110 is specially depicted as a dashed line and rendered transparent, and the light emitted by the light-emitting devices 120 is directed toward the front (in a direction entering the plane of the figure). The substrate has a first region A1, a second region A2, and a third region A3, where the first region A1 corresponds to a direction of an oncoming vehicle 60. In countries where vehicles drive on the right side of the road, the first region A1 is located on the left side of the substrate 110, as illustrated in FIG. 1. Conversely, in countries where vehicles drive on the left side of the road, the first region A1 is located on the right side of the substrate 110. The second region A2 and the third region A3 correspond to a direction of the preceding vehicle in the same direction, and the second region A2 is located above the third region A3.

The light-emitting devices 120 are distributed in the first region A1, the second region A2, and the third region A3, where an interval G1 between the light-emitting devices 120 in the first region A1 is greater than an interval G2 between the light-emitting devices 120 in the second region A2, and the interval G2 between the light-emitting devices 120 in the second region A2 is greater than an interval G3 between the light-emitting devices 120 in the third region A3. This design is based on the principle that there is less need to project high-intensity light toward the oncoming vehicle 60, and the intensity of light illuminating the ground in front of the vehicle usually needs to be higher than the intensity of light illuminating the area above the front of the vehicle. Moreover, the arrangement of the light-emitting devices 120 in this design is less dense, which helps to reduce heat accumulation. Accordingly, the vehicle lamp system 100 provided in this embodiment need not adopt any complex heat dissipation system and thus can have a simpler structure and lower cost.

In this embodiment, the light-emitting devices 120 are, for instance, light-emitting diodes (LED), and the substrate 110 is, for instance, a circuit board, which should not be construed as a limitation in this disclosure.

Figure 3:
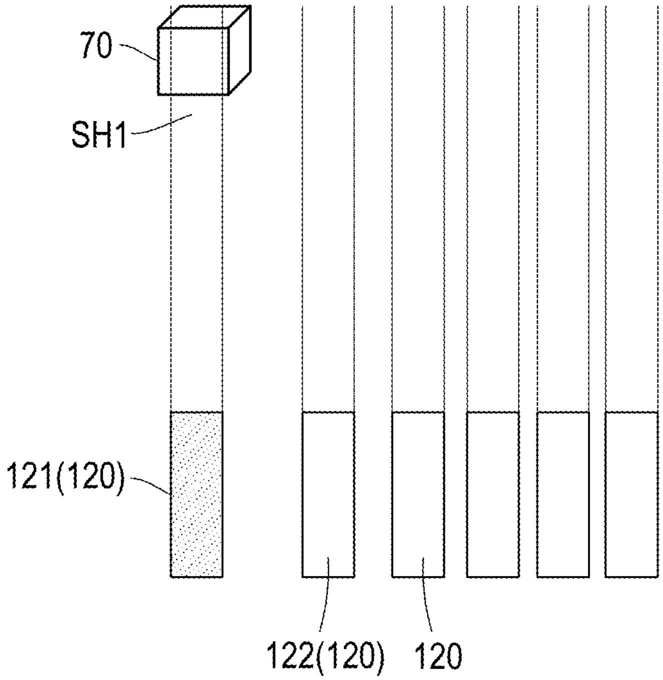
FIG. 3 illustrates the relationship between shadow regions of the light-emitting devices in FIG. 1 and a traffic object ahead.
Figure 4A:
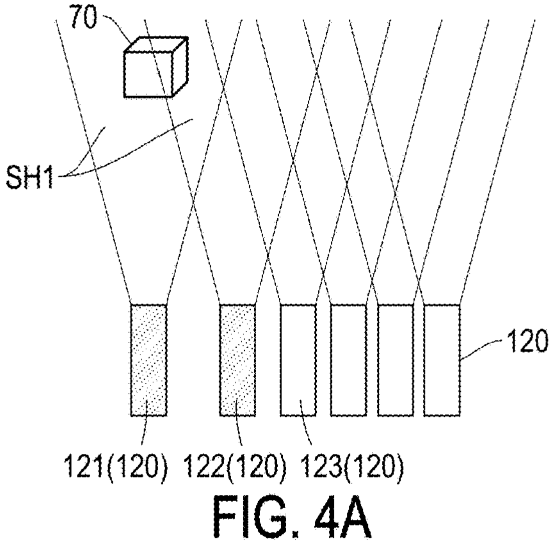
FIG. 4A to FIG. 4C illustrate the relationship between the shadow regions of the light-emitting devices in FIG. 1 according to another embodiment of the disclosure and positions of three types of traffic objects ahead.
Figure 4B:
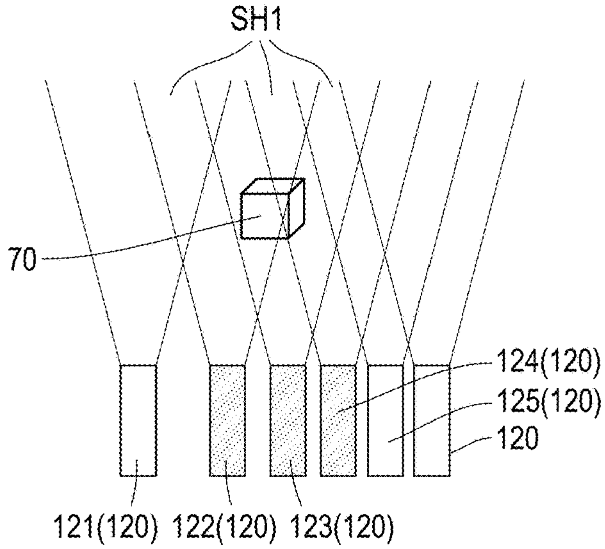
Figure 4C:
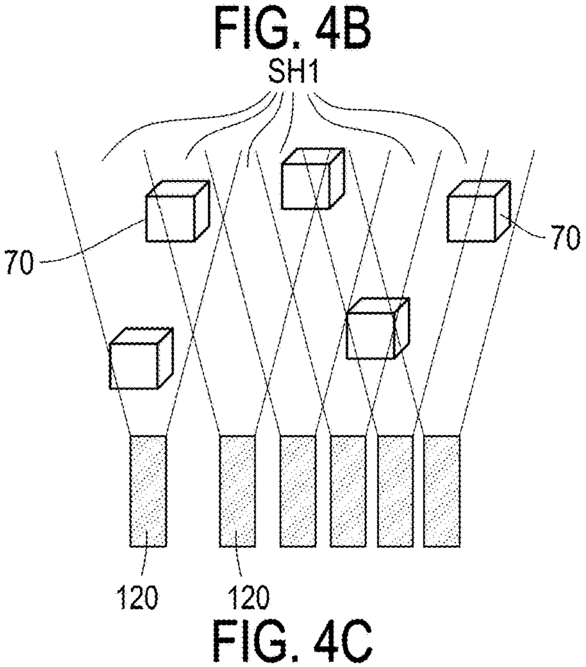

FIG. 3 illustrates the relationship between shadow regions of the light-emitting devices in FIG. 1 and a traffic object ahead, while FIG. 4A to FIG. 4C illustrate the relationship between the shadow regions of the light-emitting devices in FIG. 1 according to another embodiment of the disclosure and positions of three types of traffic objects ahead. With reference to FIG. 2, FIG. 3 and FIG. 4A to FIG. 4C, in this embodiment, the vehicle lamp system 100 further includes a sensor 130 and a controller 140. The sensor 130 is configured to sense at least one traffic object 70 in front of the vehicle. In this embodiment, the sensor 130 is, for instance, a camera. The controller 140 is electrically connected to the light-emitting devices 120 and the sensor 130 and configured to determine, based on a sensing signal transmitted from the sensor 130, whether the at least one traffic object 70 falls within shadow regions SH1 generated in response to at least one part of the light-emitting devices 120 being turned off, and the controller 140 is configured to reduce the brightness of the at least one part of the light-emitting devices 120 or turn off the at least one part of the light-emitting devices 120 in response to determining that the at least one traffic object 70 falls within the shadow regions SH1 generated in response to the at least one part of the light-emitting devices 120 being turned off. In other words, in response to determining by the controller 140 that the at least one traffic object 70 falls within the shadow regions SH1 generated in response to the at least one part of the light-emitting devices 120 being turned off, the controller 140 reduces the brightness of the at least one part of the light-emitting devices 120 or turns off the at least one part of the light-emitting devices 120.

Figure 5:
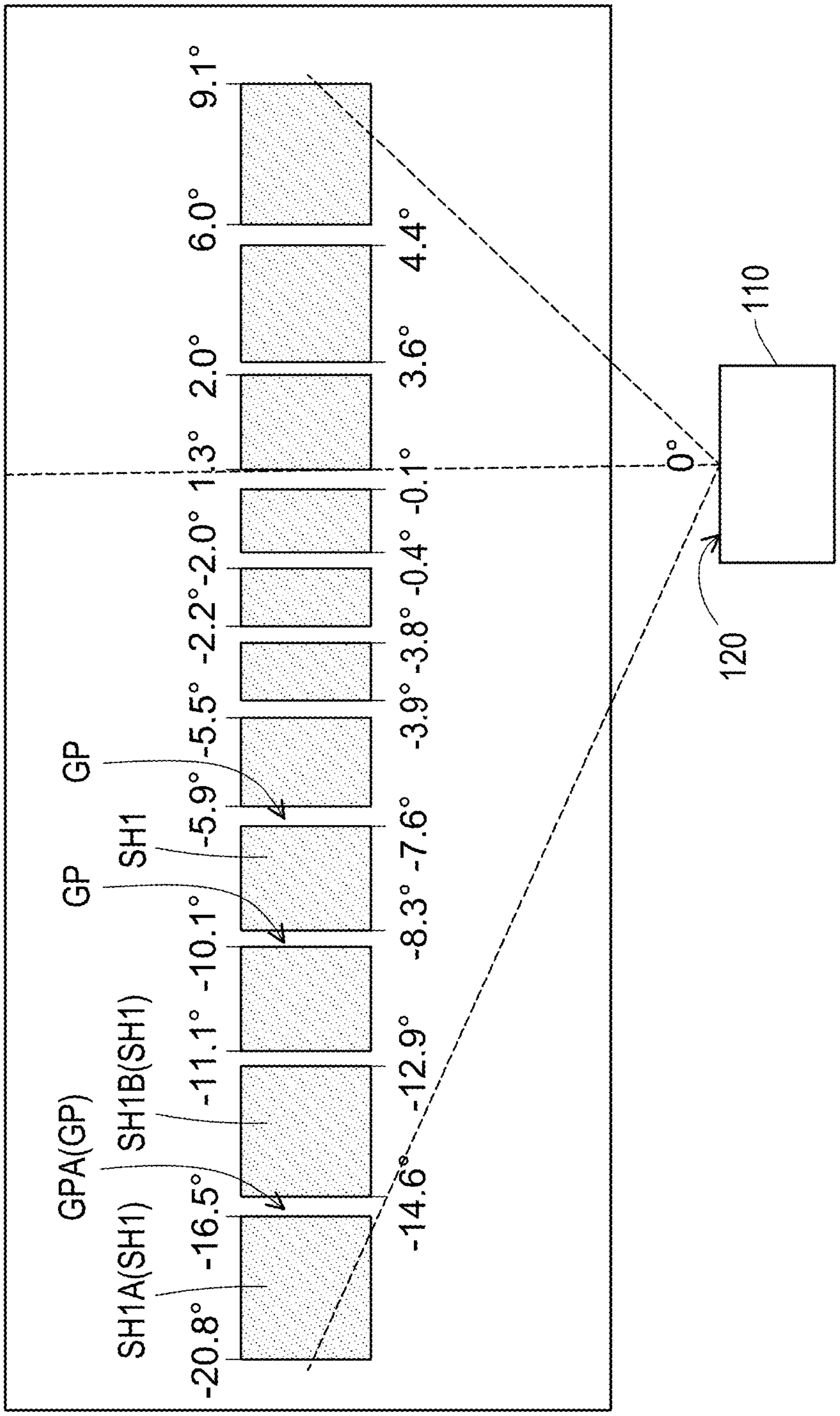
FIG. 5 is a schematic view of the light-emitting devices and the shadow regions in FIG. 2.

For instance, as illustrated in FIG. 3, when the field of view angle of the light-emitting devices 120 is relatively narrow, the illumination regions of the light-emitting devices 120 do not partially overlap, resulting in the intersection of the shadow regions SH1 generated in response to the light-emitting devices 120 being turned off (i.e., the shadow regions SH1 partially overlap). In response to detecting by the sensor 130 that the traffic object 70 falls within the shadow region SH1 corresponding to the light-emitting device 121, the controller 140 reduces the brightness of the light-emitting device 121 or turn off the light-emitting device 121 to avoid affecting the driver of the traffic object 70 (e.g., an oncoming vehicle) with overly bright illumination. As illustrated in FIG. 4A to FIG. 4C, when the field of view angle of the light-emitting devices 120 is relatively wide, the illumination regions of the light-emitting devices 120 intersect (i.e., partially overlap), causing discontinuities in the shadow regions SH1 generated in response to the light-emitting devices 120 being turned off (as shown in FIG. 5). Moreover, as illustrated in FIG. 4A, the traffic object 70 simultaneously falls within the shadow regions SH1 corresponding to both of the light-emitting devices 121 and 122, and thus the controller 140 reduces the brightness of both of the light-emitting devices 121 and 122 or turns off both of the light-emitting devices 121 and 122. Similarly, in FIG. 4B, the controller 140 should reduce the brightness of the light-emitting devices 122, 123, and 124 or turn off the light-emitting devices 122, 123, and 124. In FIG. 4C, because the traffic objects 70 are distributed into all of the shadow regions SH1 of all of the light-emitting devices 120, the controller 140 reduces the brightness of all of the light-emitting devices 120 or turns off all of the light-emitting devices 120.

In one embodiment of the disclosure, in response to determining that the traffic object 70 falls within the shadow regions SH1 generated in response to at least one part of the light-emitting devices 120 being turned off, the controller 140 is further configured to reduce the brightness of at least one adjacent light-emitting device 120 or turn off at least one adjacent light-emitting device 120, where the at least one adjacent light-emitting device 120 is adjacent to the at least one part of the light-emitting devices 120. For instance, in the exemplary embodiment depicted in FIG. 3, the controller 140 can further reduce the brightness of the adjacent light-emitting device 122 or turn off the adjacent light-emitting device 122. In the exemplary embodiment depicted in FIG. 4A, the controller 140 can further reduce the brightness of the adjacent light-emitting device 123 or turn off the adjacent light-emitting device 123. In the exemplary embodiment depicted in FIG. 4B, the controller 140 can further reduce the brightness of the adjacent light-emitting devices 121 and 125 or turn off the adjacent light-emitting devices 121 and 125.

FIG. 5 is a schematic view of the light-emitting devices and the shadow regions in FIG. 2. With reference to FIG. 1, FIG. 2 and FIG. 5, the controller 140 is configured to determine, based on the sensing signal transmitted from the sensor 130, whether the traffic object 70 falls within a gap GP between the shadow regions SH1 generated in response to at least one part of the light-emitting devices 120 being turned off, and the controller 140 is configured to, in response to determining that the traffic object 70 falls within the gap GP between the shadow regions SH1 generated in response to at least one part of the light-emitting devices 120 being turned off, reduce the brightness of the at least one part of the light-emitting devices 120 corresponding to the shadow regions SH1 on both sides of the gap GP or turn off the at least one part of the light-emitting devices 120 corresponding to the shadow regions SH1 on both sides of the gap GP. For instance, in FIG. 5, the shadow regions SH1 are discontinuous, and the gaps GP exist between adjacent shadow regions SH1. In response to the traffic object 70 falling within the gap GPA in FIG. 5, the controller 140 may reduce the brightness of two light-emitting devices 120 corresponding to the shadow region SH1A and the shadow region SH1B on both sides of the gap GPA.

Figure 6A:
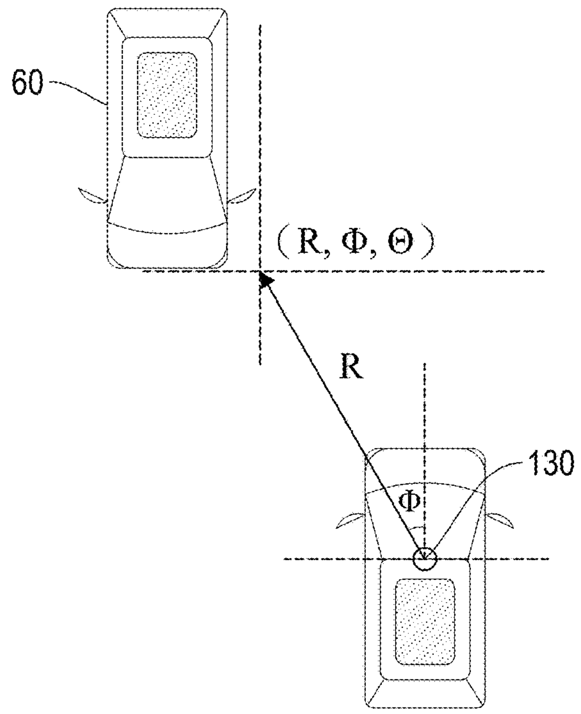
FIG. 6A illustrates coordinates of a traffic object relative to the sensor in FIG. 2.
Figure 6B:
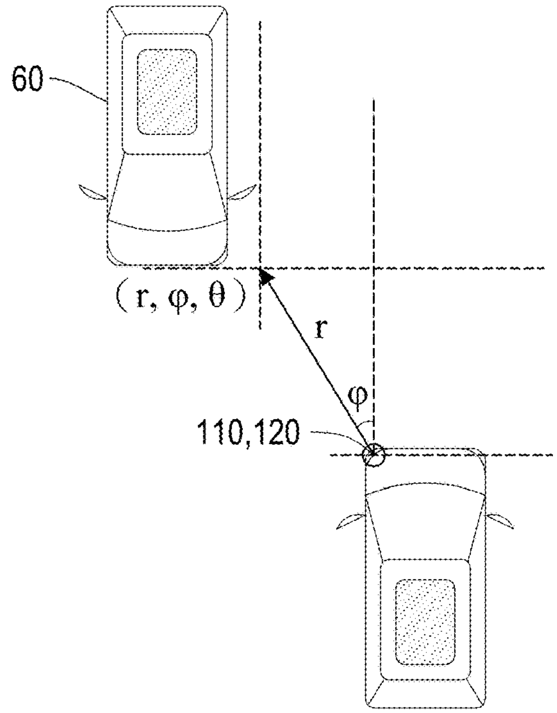
FIG. 6B illustrates coordinates of a traffic object relative to the light-emitting devices in FIG. 2.

FIG. 6A illustrates coordinates of a traffic object relative to the sensor in FIG. 2, while FIG. 6B illustrates coordinates of a traffic object relative to the light-emitting devices in FIG. 2. With reference to FIG. 2, FIG. 6A and FIG. 6B, the controller 140 is configured to convert coordinates (R, Φ, Θ) of a traffic object (an oncoming vehicle 60 acting as an example in FIG. 6A and FIG. 6B) measured by the sensor 130 into coordinates (r, φ, θ) of a traffic object relative to the light-emitting devices 120, and the controller 140 further determines whether the traffic object falls within the shadow regions SH1 generated in response to at least one part of the light-emitting devices 120 being turned off.

Figure 7:
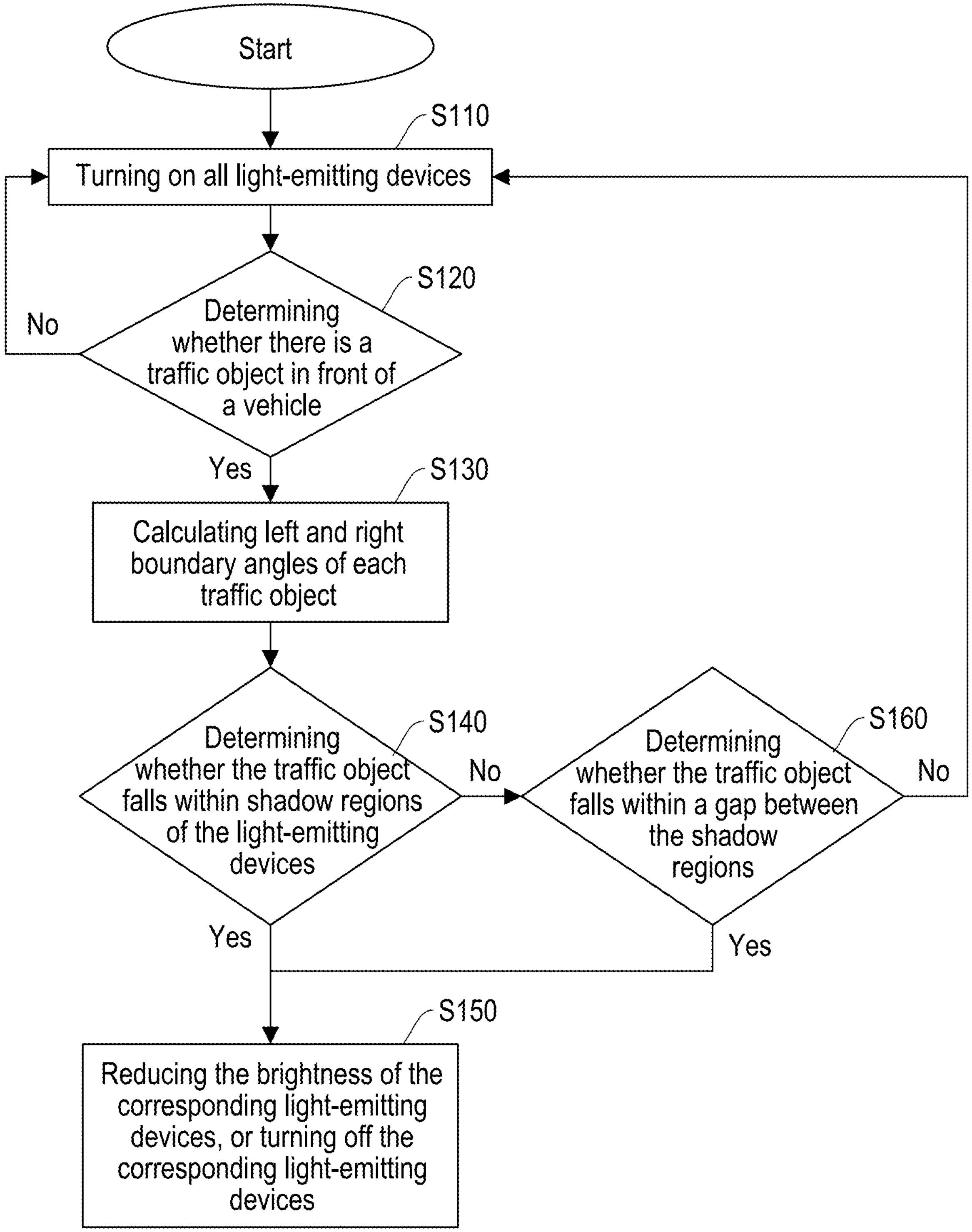
FIG. 7 is a flowchart of an active light adjustment method for a vehicle lamp system according to an embodiment of the disclosure.

FIG. 7 is a flowchart of an active light adjustment method for a vehicle lamp system according to an embodiment of the disclosure. With reference to FIG. 1, FIG. 2, and FIG. 7, the active light adjustment method for a vehicle lamp system provided in this embodiment may be executed by applying the vehicle lamp system 100 depicted in FIG. 1 and FIG. 2 and includes a step of providing the vehicle lamp system 100 and the method executed by the aforementioned controller 140.

In the active light adjustment method for the vehicle lamp system as provided in this embodiment of the disclosure, whether to reduce the brightness of the light-emitting devices 120 or turn off the light-emitting devices 120 is determined by determining, based on the sensing signal generated by the sensor 130, whether the traffic object 70 falls within the shadow regions SH1 generated in response to at least one part of the light-emitting devices 120 being turned off. As a result, the active light adjustment method for the vehicle lamp system provided in this embodiment is relatively simple and uncomplicated.

For instance, first, step S110 is performed, in which the controller 130 turns on all the light-emitting devices 120. Next, step S120 is performed, where the controller 130 determines whether there is a traffic object 70 in front of the vehicle based on the sensing signal generated by the sensor 1300. If the answer is "no", the process returns to step S110; if the answer is "yes", the process continues to execute step S130.

In step S130, the controller 130 calculates the left and right boundary angles of each traffic object 70. Then, step S140 is performed to determine whether the traffic object 70 falls within the shadow regions SH1 of the light-emitting devices 120. If the answer is "yes", the process continues to execute step S150, in which the brightness of the corresponding light-emitting devices 120 is reduced, or the corresponding light-emitting devices 120 are turned off. If the determination result of step S140 is "no", step S160 is executed to determine whether the traffic object 70 falls within the gap GP between the shadow regions SH1. If the answer is "yes", the process continues to execute step S150, where the corresponding light-emitting devices 120 refer to the light-emitting devices 120 corresponding to the shadow regions SH1 on both sides of the gap GP. If the determination result of step S160 is "no", the process returns to step S110.

Figure 8:
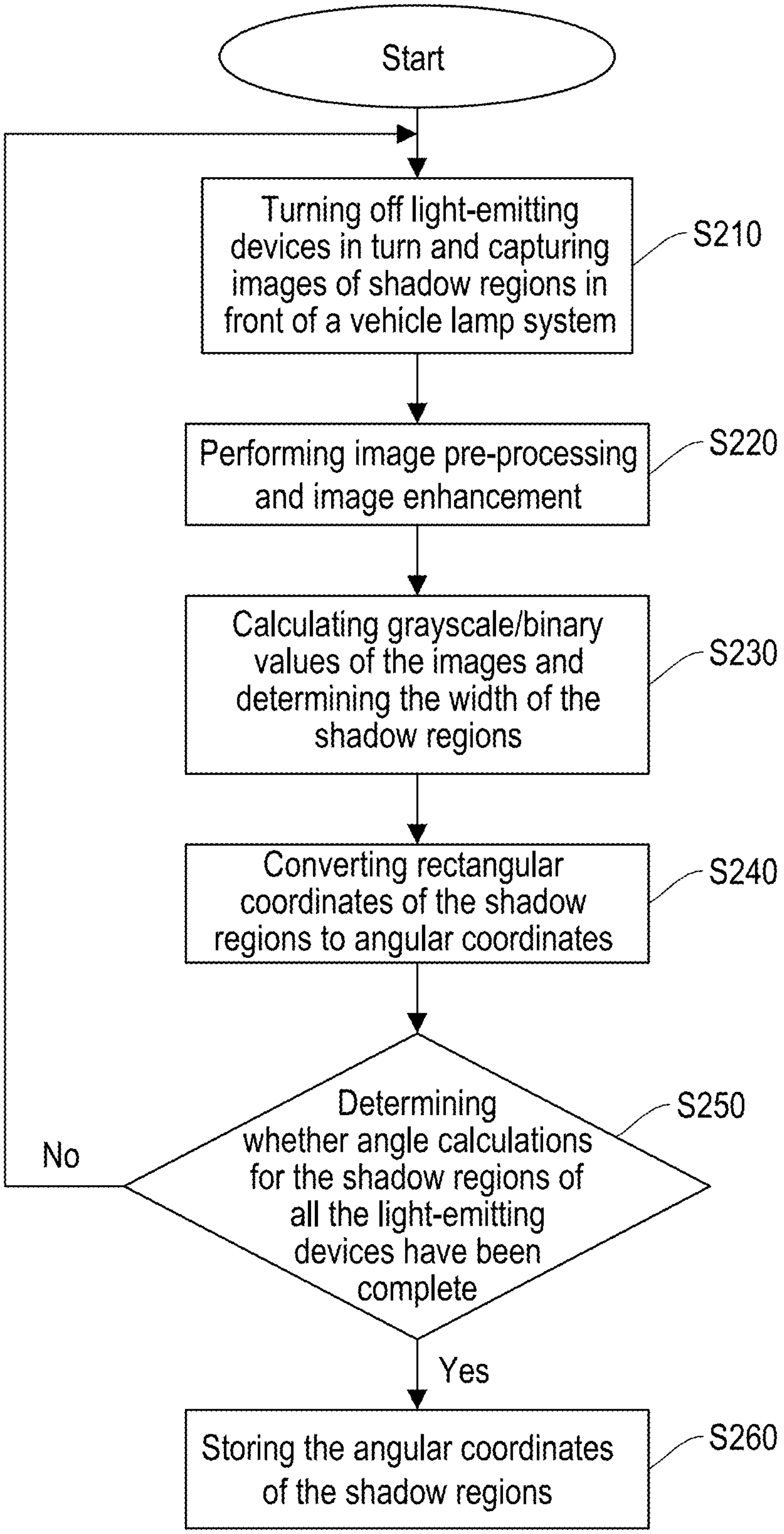
FIG. 8 and FIG. 9 are calibration flowcharts for the vehicle lamp system in FIG. 2.
Figure 9:
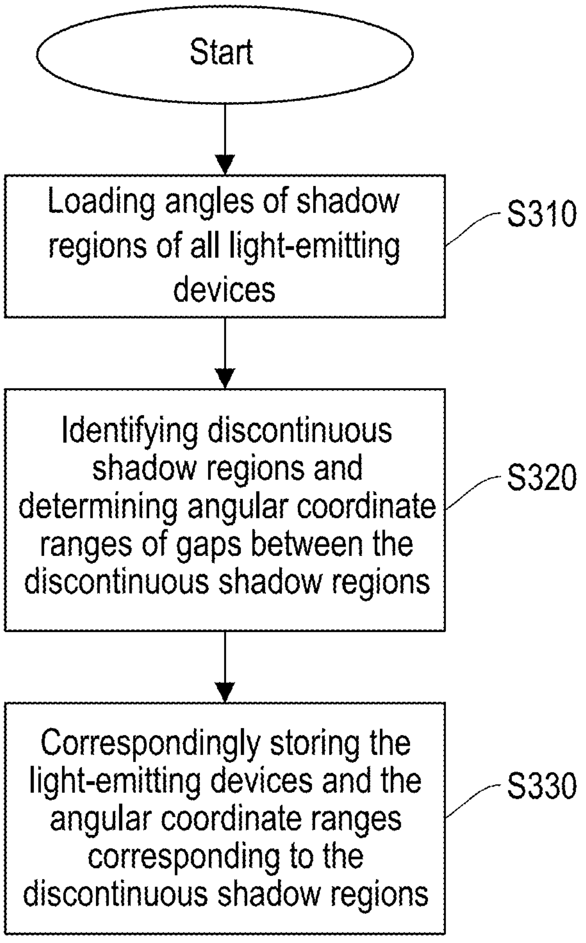

FIG. 8 and FIG. 9 are calibration flowcharts for the vehicle lamp system in FIG. 2. The vehicle lamp system 100 provided in this embodiment can be calibrated according to the flowcharts in FIG. 8 and FIG. 9 before leaving the factory or before use. With reference to FIG. 1, FIG. 2, and FIG. 8, step S210 is performed, in which the light-emitting devices 120 are turned off in turn, and images of the shadow regions SH1 in front of the vehicle lamp system 100 are captured. Subsequently, step S220 is executed, where image pre-processing and image enhancement are performed on the captured images, such as adjusting white balance or brightness compensation. Then, step S230 is executed, where color images are converted to grayscale images (i.e., gray images), then the grayscale images are further binarized, and the binarized images are utilized to determine the width of the shadow regions SH1. Next, step S240 is executed, where rectangular coordinates of the shadow regions SH1 are converted to angular coordinates. Then, step S250 is executed to determine whether the angle calculations for the shadow regions SH1 of all light-emitting devices 120 have been completed. If the answer is "yes", the process continues to execute step S260, which is to store the angular coordinates of the shadow regions SH1 corresponding to the light-emitting devices 120 (e.g., storing the angular coordinates in a memory electrically connected to the controller 140), so as to allow the controller 140 to determine during subsequent use whether the traffic object 70 falls within the shadow regions SH1 generated in response to at least one part of the light-emitting devices 120 being turned off. If the determination result of step S250 is "no", the process returns to step S210 to turn off the next light-emitting device 120 or the next group of light-emitting devices 120.

With further reference to FIG. 1, FIG. 2, and FIG. 9, step S310 can be further executed load the angles of the shadow regions SH1 of all light-emitting devices 120. Then, step S320 is executed to identify discontinuous shadow regions SH1 and determine the angular coordinate ranges of the gaps GP between the discontinuous shadow regions SH1. Next, step S330 is executed to correspondingly store the light-emitting devices 120 and the angular coordinate ranges corresponding to the discontinuous shadow regions SH1, so as to determine whether the traffic object 70 falls within the gaps GP between the shadow regions SH1 generated in response to at least one part of the light-emitting devices 120 being turned off.

In an embodiment of the disclosure, the controller 140 is, for instance, a central processing unit (CPU), a microprocessor, a digital signal processor (DSP), a programmable controller, a programmable logic device (PLD), any other similar device, or a combination of these devices, which should not be construed as a limitation in the disclosure. Besides, in an embodiment of the disclosure, the various functions of the controller 140 can be implemented in form of a plurality of codes. These codes can be stored in a memory and executed by the controller 140. Alternatively, in an embodiment of the disclosure, the various functions of the controller 140 can be implemented in form of one or more circuits. Whether the various functions of the controller 140 are implemented in form of software or hardware should not be construed as a limitation in the disclosure.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents

What is claimed is:

1. A vehicle lamp system, comprising:

a substrate, having a first region, a second region, and a third region, wherein the first region corresponds to a direction of an oncoming vehicle, the second region and the third region correspond to a direction of a preceding vehicle in a same direction, and the second region is located above the third region; and a plurality of light-emitting devices, disposed on the substrate and distributed in the first region, the second region, and the third region, wherein an interval between the light-emitting devices in the first region is greater than an interval between the light-emitting devices in the second region, and the interval between the light-emitting devices in the second region is greater than an interval between the light-emitting devices in the third region.

2. The vehicle lamp system according to claim 1, further comprising:

a sensor, configured to sense at least one traffic object ahead; and a controller, electrically connected to the light-emitting devices and the sensor, configured to determine, based on a sensing signal transmitted from the sensor, whether the at least one traffic object falls within shadow regions generated in response to at least one part of the light-emitting devices being turned off, and configured to reduce a brightness of the at least one part of the light-emitting devices or turn off the at least one part of the light-emitting devices in response to determining that the traffic object falls within the shadow regions generated in response to the at least one part of the light-emitting devices being turned off.

3. The vehicle lamp system according to claim 2, wherein the controller is further configured to reduce a brightness of at least one adjacent light-emitting device of the light-emitting devices or turn off the at least one adjacent light-emitting device in response to determining that the traffic object falls within the shadow regions generated in response to the at least one part of the light-emitting devices being turned off, wherein the at least one adjacent light-emitting device is adjacent to the at least one part of the light-emitting devices.

4. The vehicle lamp system according to claim 1, further comprising:

a sensor, configured to sense at least one traffic object ahead; and a controller, electrically connected to the light-emitting devices and the sensor, configured to determine, based on a sensing signal transmitted from the sensor, whether the at least one traffic object falls within a gap between the shadow regions generated in response to at least one part of the light-emitting devices being turned off, and configured to reduce a brightness of the at least one part of the light-emitting devices corresponding to the shadow regions on both sides of the gap or turn off the at least one part of the light-emitting devices corresponding to the shadow regions on both sides of the gap in response to determining that the at least one traffic object falls within the gap between the shadow regions generated in response to the at least one part of the light-emitting devices being turned off.

5. The vehicle lamp system according to claim 1, wherein the controller is configured to convert a coordinate of the at least one traffic object measured by the sensor into a coordinate of the at least one traffic object relative to the light-emitting devices and further determine whether the at least one traffic object falls within shadow regions generated in response to at least one part of the light-emitting devices being turned off.

6. An active light adjustment method for a vehicle lamp system, comprising:

providing a vehicle lamp system, wherein the vehicle lamp system comprises a plurality of light-emitting devices and a sensor;

sensing at least one traffic object ahead by the sensor; and based on a sensing signal transmitted from the sensor, determining whether the at least one traffic object falls within coordinate ranges of shadow regions wherein the shadow regions are generated in response to at least one part of the light-emitting devices being turned off, and reducing a brightness of the at least one part of the light-emitting devices or turning off the at least one part of the light-emitting devices in response to determining that the at least one traffic object falls within the coordinate ranges of the shadow regions, wherein the active light adjustment method further comprises step (a), step (b), step (c), or step (d), wherein the step (a) comprises:

reducing a brightness of at least one adjacent light-emitting device of the light-emitting devices or turning off the at least one adjacent light-emitting device in response to determining that the at least one traffic object falls within the shadow regions generated in response to the at least one part of the light-emitting devices being turned off, wherein the at least one adjacent light-emitting device is adjacent to the at least one part of the light-emitting devices, wherein the step (b) comprises:

based on the sensing signal transmitted from the sensor, determining whether the at least one traffic object falls within a gap between the shadow regions generated in response to the at least one part of the light-emitting devices being turned off, and reducing the brightness of the at least one part of the light-emitting devices corresponding to the shadow regions on both sides of the gap or turning off the at least one part of the light-emitting devices corresponding to the shadow regions on both sides of the gap in response to determining that the at least one traffic object falls within the gap between the shadow regions generated in response to the at least one part of the light-emitting devices being turned off, wherein the step (c) comprises:

converting a coordinate of the at least one traffic object measured by the sensor into a coordinate of the at least one traffic object relative to the light-emitting devices and further determining whether the at least one traffic object falls within the shadow regions generated in response to the at least one part of the light-emitting devices being turned off, and wherein the step (d) comprises:

alternately turning off the light-emitting devices, and capturing images of the shadow regions in front of the vehicle lamp system;

converting rectangular coordinates of the shadow regions into angular coordinates; and storing a plurality of the angular coordinates of a plurality of the shadow regions corresponding to the light-emitting devices to determine whether the at least one traffic object falls within the shadow regions generated in response to the at least one part of the light-emitting devices being turned off.

7. The active light adjustment method according to claim 6, wherein the active light adjustment method comprises the step (d), and further comprises:

identifying the shadow regions that are discontinuous;

identifying an angular coordinate range of the gap between the discontinuous shadow regions; and correspondingly storing the light-emitting devices corresponding to the discontinuous shadow regions and the angular coordinate range to determine whether the at least one traffic object falls within the gap between the shadow regions generated in response to the at least one part of the light-emitting devices being turned off.

* * * * *